(12) United States Patent
Martin et al.

(10) Patent No.: US 6,392,183 B1
(45) Date of Patent: May 21, 2002

(54) PROCESS AND DEVICE FOR MACHINING BY ELECTROEROSION

(75) Inventors: Roland Martin, Dingy en Vuache (FR); Aldo Gamboni, Geneva (CH); Maurizio Tognolini, Le Muids (CH); Gilbert Bovay, Lausanne (CH)

(73) Assignee: Charmilles Technologies SA, Meyrin (CH)

( * ) Notice: Subject to any disclaimer, the term of this patent is extended or adjusted under 35 U.S.C. 154(b) by 21 days.

(21) Appl. No.: 09/599,780

(22) Filed: Jun. 21, 2000

(30) Foreign Application Priority Data

Jun. 21, 1999 (CH) .............................. 1153/99

(51) Int. Cl.[7] .............................. B23H 1/02; B23H 7/20
(52) U.S. Cl. .................................. 219/69.13; 219/69.18
(58) Field of Search ....................... 219/69.13, 69.18; 205/647, 652; 204/224 M; 700/162

(56) References Cited

U.S. PATENT DOCUMENTS

| | | | | |
|---|---|---|---|---|
| 3,655,937 A | * | 4/1972 | Ullmann et al. | 219/69.18 |
| 3,974,357 A | | 8/1976 | Saito et al. | 219/69.13 |
| 4,237,370 A | | 12/1980 | Ullmann | 219/69.18 |
| 4,945,199 A | * | 7/1990 | Tanaka et al. | 219/69.13 |
| 5,336,864 A | * | 8/1994 | Martin | 219/69.18 |
| 5,374,798 A | * | 12/1994 | Kinbara | 219/69.18 |

FOREIGN PATENT DOCUMENTS

| | | |
|---|---|---|
| EP | 0412262 A1 | 2/1991 |
| JP | 64-58426 | 3/1989 |

* cited by examiner

*Primary Examiner*—Geoffrey S. Evans
(74) *Attorney, Agent, or Firm*—Young & Thompson

(57) ABSTRACT

In the process of machining by electroerosion, there is adjusted during a first transitory phase the machining current increase of the discharges after triggering a discharge between the electrode and the piece, such that a parameter connected to this increase will be substantially equal to a reference value corresponding to a minimum wear value of the electrode. Then, the machining current is maintained during a second phase at a reference value. The adjustment is carried out by acting on the adjustable internal voltage of a low impedance adjustable voltage source connected between the electrode and the piece. The adjustment can be carried out by a servo control loop with a regulator of the internal voltage, a device for generating discharges, parts adapted to determine the slope of increase of the current of a discharge, a member determining the mean slope of N discharges and a member adapted to compute the difference between the mean slope and a pre-established reference slope.

22 Claims, 7 Drawing Sheets

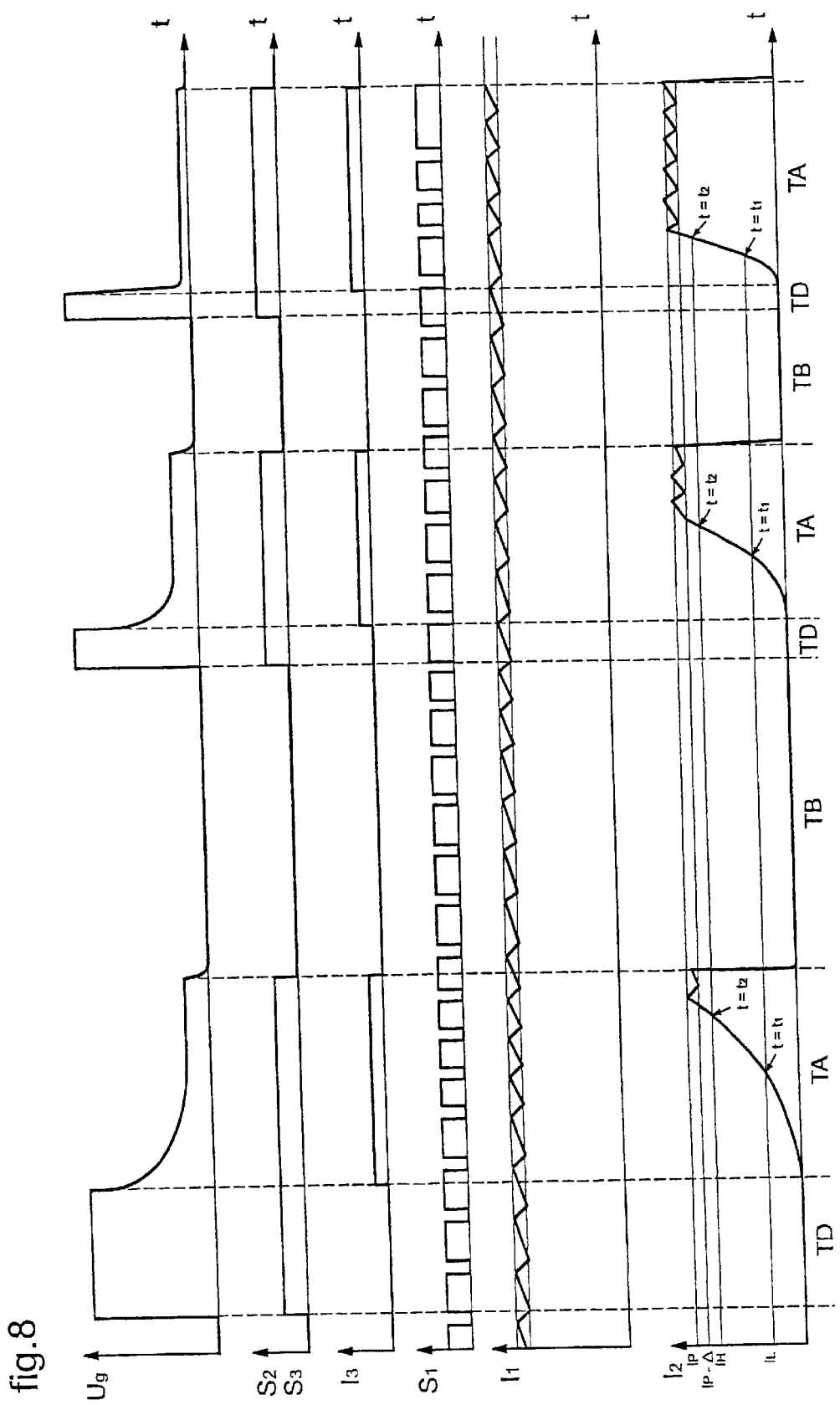

PROCESS AND DEVICE FOR MACHINING BY ELECTROEROSION

BACKGROUND OF THE INVENTION

The present invention relates to a process and device for machining by electroerosion, with which an electrode-piece is machined by means of an electrode-tool separated from each other by a working space by applying electrical pulses between the electrode-tool and the electrode-piece by means of an electrical circuit comprising at least one low impedance voltage source and a regulation circuit.

DESCRIPTION OF THE RELATED ART

Machining by electroerosion requires a generator of intermittent discharges, which is connected between the piece and the electrode, the latter having for its purpose to penetrate progressively into the piece thanks to the erosive action of the discharges.

As the electrode is subjected to only low wear, there is obtained a faithful hollow reproduction of the shape of the electrode in the case of a penetration along a single axis, thanks to a servomechanism which maintains an optimum distance between the piece and the electrode, a so-called sparking distance, and which is the order of several dozens of microns. Other servomechanisms can ensure the relative translatory and/or rotative movements along other axes and one takes account of the amplitudes of these movements to predetermine the deformation of the imprint. These movements and these servomechanisms will not be described nor even shown here, as they relate to well-known and mastered techniques. However, precise imprints cannot be obtained unless the initial dimensions of the electrode are maintained in the course of machining, and if this is not the case, it is necessary to provide several electrodes, which gives rise to supplemental costs and renders electroerosion less economical. The problem of providing a generator with very low wear is always present, although the performances in terms of volumetric wear are remarkable, because there are nowadays obtained, with current generators, certain favorable conditions, and values as low as 0.1%. Unfortunately, this wear is not equally distributed, it is in fact concentrated on the pointed portions and edges of the electrode, such that perfect reproduction of shape is not ensured.

The generators of the type with limitation of current by resistance are known from the time that it has been known to use transistors for generating intermittent discharges. FIG. 14 shows in a very simplified way the principle, particularly by symbolizing the transistor by a switch S. $E_0$ is the internal voltage or vacuum voltage of the source, the current is limited by the resistance R, by the parasitic or distributed inductance of value L, and by the impedance of the space between the electrode and the piece. During an erosive discharge, this impedance is represented in an idealized way by an element which maintains the voltage $U_g$ at its terminals, no matter what the current i. Of course, the physical reality is much more complicated, particularly by virtue of the fact that the electrode-piece voltage is substantially higher at the beginning of discharge, and develops toward a certain value $U_g$ defined as being the mean statistic of the voltages at the end of discharge. For an understanding of what follows, it will be recalled that, at the beginning of a discharge, the current increases with a slope $di/dt=(E_0-U_g)/L$ and which tends asymptotically toward $(E_0-U_g)/R$. This type of generator gives acceptable wear, but unfortunately obtaining very low wear requires, as will be seen later on, an adjustable voltage $E_0$ which is very near $U_g$, such that the control of the asymptotic current requires again finely adjusting the value of R, which would be very difficult and costly.

The generators of the current source type form a second category which offers much flexibility as to the control of the current, because switching transistors require the current to follow a standard. They are thus capable of maintaining a practically constant current during discharge, no matter what the voltage at its terminals, or at least toward a certain limit.

But this type of generator has the drawback of producing current pulses with an initial slope that is much too steep, which is a cause of wear.

SUMMARY OF THE INVENTION

The object of the present invention is to obtain a process and a device which eliminate the mentioned drawbacks, and which permit reducing the wear of the electrode-tool to a minimum and to provide a perfect shape reproduction, whilst ensuring easy control of the current during and after the rise of the machining current.

The invention is characterized to this end by the fact that there is carried out an adjustment of the current rise of the electrical pulses as a function of the time after triggering a discharge between the electrode-tool and the electrode-piece such that a parameter connected to this current rise will be substantially equal to a reference size corresponding to a minimum wear value of the electrode-tool.

These characteristics permit obtaining a machining process and device ensuring very low wear of the electrode-tool. The initial dimensions and shape of this latter are maintained during the course of machining, which renders electroerosion very precise and economical. There is thus carried out upon triggering a discharge according to a first mode in which a transitory current arises under the influence of a low impedance voltage source, which source is connected between the electrode and the piece, the impedance being sufficiently low that the increase of the current will be determined not only by the electrical characteristics of the circuit, but also by the discharge voltage, the current rise having been adjusted to a minimum wear value predetermined by technological tests and, as soon as the transitory current reaches a desired value, one operates according to a second mode in which the current is essentially determined by the electrical characteristics of the circuit.

The principal advantage, which is the obtention of very low wear, has a great economical importance, because, as mentioned in the introduction, it permits not only machining with precision, but also reducing the number of electrodes required.

Another advantage is that the process can be introduced into various known types of generators: current limitation by resistance, current limitation by inductance and switching transistors arranged to create a current source and also a DC-DC converter. Moreover, the advantages inherent in the generator serving as a platform can be preserved. For example, a generator with a current source according to the known technique is transformed into a new generator permitting controlling the initial slope of the current increase of the discharges, which permits achieving adjustments ensuring very low wear. Moreover, the advantages of the discharge with a current source are maintained, particularly the absence of any additional element such as a resistance or inductance adapted to limit the current, this latter function being ensured by the rapid switchings of the power transistors. The flexibility of control of this generator permits it to generate a wide variety of forms of current pulses.

Preferably, the process is characterized by the fact that there is carried out the adjustment of the current rise of the electrical pulses during a first transitory phase and that the machining current is maintained during a second phase at at least a reference value as soon as the current increase has reached this reference value.

There is thus obtained a very low wear of the electro-tool associated with an effective electroerosion and easy control.

According to a preferred embodiment, the adjustment of the rise of current is carried out by means of a loop such that a statistical size representative of said parameter coincides with said predetermined reference size.

Given the fact that the adjustment of the rise of machining current is very critical, a mechanism permits ensuring reproducibility in the field of regimes with very low wear obtained in the laboratory, in spite of the disturbances such as differences in line lengths, aging and tolerance of the elements, variations of temperature, etc.

Very favorably, said adjustment is carried out by acting on the adjustable internal voltage of at least one low impedance adjustable voltage source.

These characteristics permit obtaining a very fine and precise adjustment of the slope of the increase of the machining current.

Preferably, the reference size corresponding to a minimum wear value is determined by causing the internal voltage of the adjustable voltage source to vary, and by observing the dispersion of the spectrum of the angles of the slope of increase of current of a given number of discharges.

The reference size could also be obtained when the dispersion of this spectrum is substantially maximum.

The surprising result of the measurements of wear demonstrate that a minimum wear is in direct correlation with the dispersion of the spectrum of the increases of the current of a series of discharges. There can thus be obtained, from the observation of the dispersion of the spectrum of the increases of current, the minimum wear conditions corresponding to a value of the reference size, such as the optimum slope of the increase of the machining current.

A preferred embodiment is characterized by the fact that there is carried out an automatic control of a mean slope of increase of current of the erosive discharges by means of successive servo groups, by starting a machining cycle with said internal voltage fixed to an initial value corresponding to a pre-established reference voltage, by spacing by a discrimination test of the contaminated discharges, short circuits and arcs, by determining the slope of increase and current of the retained discharges, by carrying out n=N cycles of machining by calculating the mean slope of increase of current over the N retained discharges, by comparing the mean slope of increase of current obtained at said reference slope, by decreasing respectively increasing the internal voltage by a predetermined adjustment value, if the mean calculated slope is greater than the reference slope plus an adjustment variation, respectively less than the reference slope decrease by this adjustment variation, so as to obtain a new initial value of said internal voltage and by carrying out successive servo loops with new initial values of the internal voltage.

This automatic control is easy to carry out with a simple control unit and permits reproducing over the field the best results as to wear.

In a surprising modification, said parameter is the size of the blocked discharges during which the low impedance voltage source does not decrease the current, the rise in current of the electrical pulses being adjusted such that the size of the blocked discharges coincides with a reference size corresponding to minimum wear.

These characteristics permit obtaining a process whose practice is easy to carry out and which ensures minimum wear results that are very favorable.

The process is thus favorably characterized by the fact that there is carried out an automatic control of the current rise of the erosive discharges by means of successive servo loops, by starting a machining cycle with said internal voltage fixed at an initial value corresponding to a pre-established reference voltage, by discarding by a discrimination test the contaminated discharges, by short circuits and arcs, by detecting the blocked discharges, by carrying out n=N machining cycles, by calculating the size of the blocked discharges, by comparing this latter to a pre-established reference size corresponding to a minimum wear of the electrode-tool, by limiting, respectively increasing the internal voltage by an adjustment value, if the calculated size is less than the reference size decreased by an adjustment variation, respectively greater than the reference size added to an adjustment variation, so as to obtain a new initial value of the internal voltage, and by carrying out successive servo loops with new initial values of the obtained internal voltage.

Of course the present invention also relates to a device for practicing a process of machining by electroerosion, comprising an electrode-tool separated by a working slot from an electrode-piece, an electrical circuit with at least one low impedance voltage source and a regulation circuit arranged so as to apply electrical impulses between the electrode-tool and the electrode-piece, characterized by the fact that it comprises adjustment means to adjust the current rise as a function of the time after triggering a discharge between the electrode-tool and the electrode-piece such that a parameter connected to this current increase will be substantially equal to a reference size corresponding to a minimum wear value of the electrode-tool.

This device permits obtaining very low wear of the electrode-tool and very precise machining. It also permits easy modification of the existing electroerosion generators for very low wear.

Preferably, the adjustment means are arranged so as to modify the adjustable internal voltage of at least one low impedance voltage source.

According to a preferred embodiment, the device is characterized by the fact that said parameter is the mean slope of the increase of machining current and by the fact that it comprises means adapted to regulate this mean slope such that it coincides with a pre-established reference slope for minimum wear of the electrode-tool.

These characteristics ensure easy and precise adjustment of the minimum wear conditions.

According to a preferred embodiment, the device is characterized by the fact that it comprises a first low impedance voltage source whose internal voltage can be adjusted by a control unit, a first branch connecting a first terminal of the first voltage source to the electrode-tool and comprising, in series, a second low impedance voltage source, a first switch, a first member for measuring a first current, a self-induction winding, a second switch, a second member for measuring a second current and a first diode, the input of the second switch being connected by a second diode to the first terminal of the first voltage source, and by the fact that the electrode-piece is connected to the second terminal of the first source by a third branch, itself connected by a third diode to the output of the first switch and by a fourth diode to the output of the second switch, the control unit receiving signals from the measuring members and addressing control signals to the first voltage source and to the switches.

There is thus obtained an electro-machining generator permitting obtaining very precise adjustment and servo control of the conditions of machining for minimum wear of the electrode-tool and an easy control of the machining current during all the cycle of one discharge.

Another very advantage embodiment is characterized by the fact that it comprises a first low impedance voltage source of which a first terminal is connected to the electrode-tool by a first branch comprising in series a first switch, an additional source of low impedance voltage whose internal voltage can be adjusted by a control unit, a measuring member of current and a first diode, by the fact that the electrode-piece is connected by a second branch with a second switch to the second terminal of the first voltage source, and by the fact that it comprises a third branch comprising a second diode connecting the inputs of the two switches and a fourth branch comprising a third diode connecting the outputs of the two switches, the control unit receiving signals from the measuring member and addressing control signals to the additional voltage source and to the switches.

This embodiment has a particularly simple and low cost construction permitting however easy control of the machining current in its transitory phase and in its regulated phase. Moreover, an adaptation of the invention to pre-existing circuits can be carried out.

BRIEF DESCRIPTION OF THE DRAWINGS

Other advantages will appear from the characteristics expressed in the dependent claims and from the description of the invention hereafter in greater detail with the help of drawings which show schematically and by way of example embodiments and variations.

FIG. 8 is a sequence of the signals from the circuit of FIG. 1 as a function of time.

DESCRIPTION OF THE PREFERRED EMBODIMENTS

Figure 1:
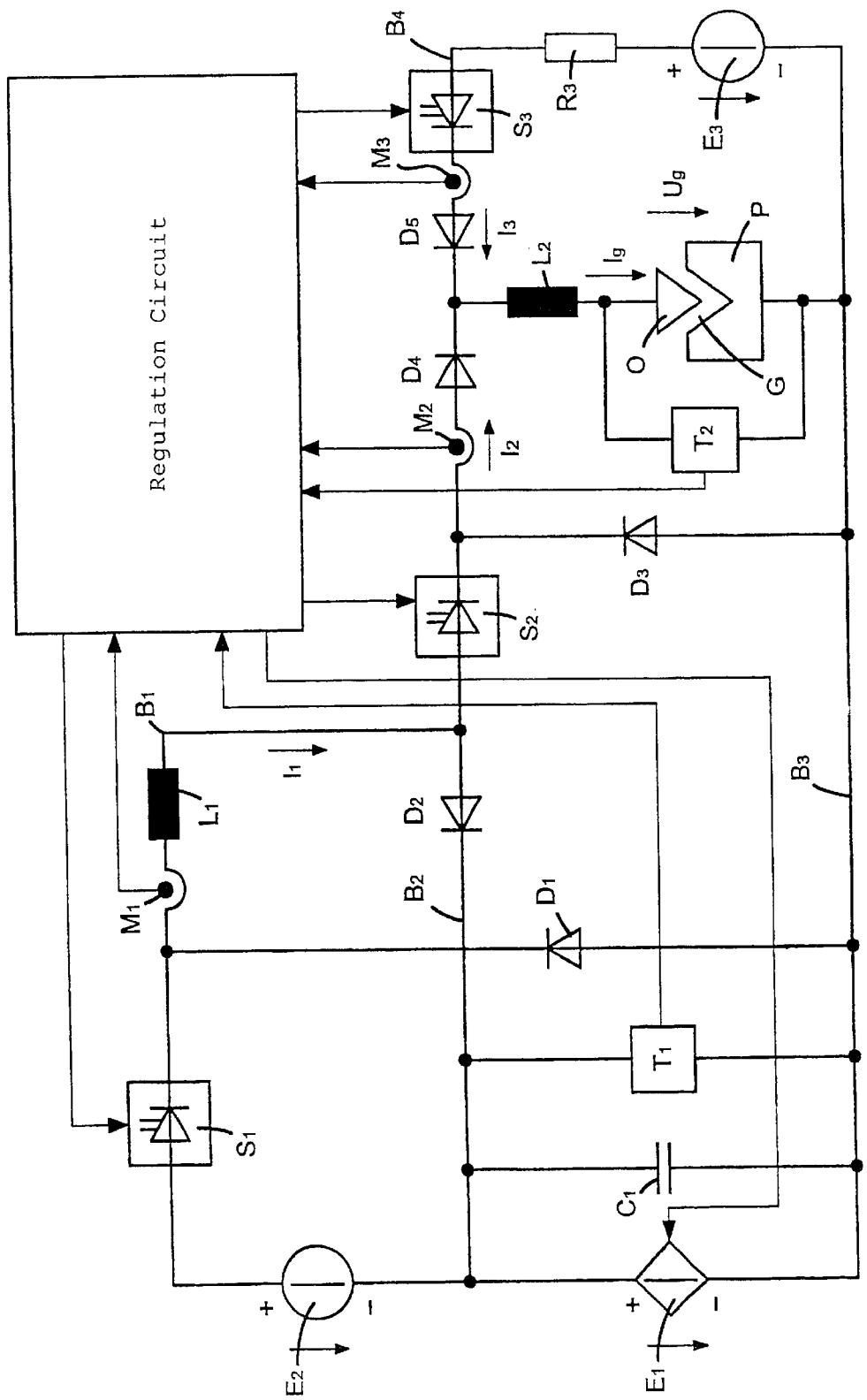
FIG. 1 is a schematic representation of a first embodiment of the device for a machine by electroerosion.

A first embodiment of the device is illustrated in FIG. 1 and comprises a low impedance voltage source $E_1$ adapted to supply the machining current necessary to carry out sparking between an electrode O and a piece P to be machined, separated by a working slot or gap G. This source $E_1$ is stabilized at a voltage $U_1$ which is adjustable and capable of supplying high current intensities without large voltage drop and adjustable with good resolution.

The positive terminal of the source $E_1$ is connected to the electrode O by a branch $B_1$ comprising, in series, an auxiliary voltage source $E_2$, the first switch $S_1$ in the form of a transistor for example, a first measuring member $M_1$ for the current $I_1$, such as a measuring resistance, a self-induction coil $L_1$ constituting an accumulator of magnetic energy, a second switch $S_2$, in the form of a transistor for example, a second measuring member $M_2$ for the current $I_2$ and a diode $D_4$, $L_2$ representing the parasitic line inductance.

The negative terminal of the auxiliary source $E_2$ is connected to the switch $S_2$ by a branch $B_2$ comprising a diode $D_2$.

A negative terminal of the source $E_1$ is connected by a branch $B_3$ to the piece P.

This circuit moreover comprises a capacitance $C_1$ and a potentiometer $T_1$, both connected in parallel to the source $E_1$ between the branches $B_2$ and $B_3$. The branch $B_3$ is moreover connected by a diode $D_3$ to the junction between switch $S_2$ and measuring member $M_2$. A second potentiometer $T_2$ is connected between the electrode O and the piece P to measure the potential $U_g$ across the gap G. A diode $D_1$ connects moreover the branch $B_3$ to the output of the switch $S_1$.

The embodiment moreover comprises a triggering circuit $B_4$ for the erosive discharges connected in parallel between the electrode and the piece at the output of the diode $D_4$ and to the piece P.

This triggering circuit $B_4$ comprises a triggering generator $E_3$, a resistance $R_3$, a switch $S_3$, a diode $D_5$ and a measuring member $M_3$ for the current $I_3$.

The assembly of this circuit is controlled by an electronic control unit CP receiving measuring signals from the elements $M_1$, $M_2$, $M_3$, $T_1$ and $T_2$ and sending control signals to the elements $E_1$, $S_1$, $S_2$ and $S_3$.

The values of the different components could typically be as follows:

Source $E_1$ between 25 and 50 V for a power of 2 kW, source $E_2$ of the order of 5 V, source $E_3$ of the order of 100 V for a power of 300 W, winding $L_1$ about 120 $\mu$H, inductance $L_2$ of the order of 2 $\mu$H, resistance $R_3$ about 50 ohms and capacitor $C_1$ about 10 $\mu$F. Preferably, the impedance of the two voltage sources $E_1$ and $E_2$ is zero.

The operation of the circuit according to FIG. 1 is explained hereafter. The conductive and non-conductive states of the switches or transistors $S_1$, $S_2$ and $S_3$ are controlled by the control unit CP.

A machining cycle is constituted by a triggering period TD, a sparking period TA and a pause period TB. In the pause period TB, the switches $S_2$ and $S_3$ are open. During this period, the source $E_2$ permits accumulating energy in the self-induction winding $L_1$. When the switch $S_1$ closes, the source $E_2$ charges the self-induction winding through the loop $E_2$, $S_1$, $M_1$, $D_2$. When the current $I_1$ measured by the measuring member $M_1$ reaches a first predetermined value, for example 2.5 Amp., the switch $S_1$ is open and the current $I_1$ decreases in a relaxation circuit $L_1$, $D_2$, $E_1$, $D_1$, $M_1$ to a second predetermined value. Thus, during the pause period, the current $I_1$ can be adjusted by the control unit CP by means of the duration of opening and closing of the switch $S_1$.

The triggering period is obtained by simultaneously closing the switches $S_2$ and $S_3$. The high impedance source $E_3$ creates a high voltage $U_g$ across the gap G measured by the potentiometer $T_2$.

The instant of triggering is detected by the passage of a current $I_3$ through the measuring member $M_3$. When triggering takes place, the sparking period begins and the control unit CP activates the measuring member $M_2$. The sparking period commences with a transitory phase of current increase during which the sparking current is established. For as long as the current $I_1$ measured by the measuring member $M_1$ is greater than the current $I_2$ passing through the measuring member $M_2$, the diode $D_2$ will be unblocked. During this transitory phase of current increase, there exists therefore the relationship $dI2/dt=(U_1-U_g)/L_2$ in which $U_1$ is the voltage of the terminals of the source $E_1$, $U_g$ the instantaneous voltage of an erosive discharge across the gap G and $L_2$ the line inductance.

When the current $I_2$ is equal to the current $I_1$, the diode $D_2$ is blocked and relieve the transitory phase to enter a regulated mode phase in which the current $I_2$ is maintained between the predetermined limits $I_p$ and $I_p-\Delta$ by opening and closing the switch $S_1$ by following the loop $E_1$, $E_2$, $S_1$, $M_1$, $L_1$, $S_2$, $M_2$, $D_4$, $L_2$, gap at the increase. The decrease of current therefore takes place in the relaxation loop $L_1$, $S_2$, $M_2$, $D_4$, $L_2$, gap, $D_1$, $M_1$. This regulated mode thus takes place during the rest of the sparking period TA, the switches $S_2$ and $S_3$ being closed. The switch $S_3$ could also be open when the triggering of a discharge takes place. Nevertheless, the closing of $D_3$ is preferable so as to avoid premature extinction of the erosive discharge.

At the end of a sparking period TA, the switches $S_2$ and $S_3$ are open to begin a pause period TB with a current $I_1$ adjusted by closing and opening the switch $S_1$ and a relaxation circuit $L_2$, gap, $D_3$, $M_2$, $D_4$ for the current $I_2$.

An important aspect of the invention consists in particular in creating said transitory mode with a current $I_2$ which arises under the influence of the low impedance source $E_1$ whose voltage $U_1$ can be adjusted and controlled by means of the control unit CP according to the law indicated above. The mode of regulation and automatic control of this source $E_1$ will be explained in detail hereafter.

The departure from the transitory mode according to the above law takes place with an initial current value delivered by the triggering generator $E_3$.

The increase of the current during this transitory phase is possible only if $U_1>U_g$ immediately after triggering, during all the increase of the current and including during the regulated mode. When the voltage $U_1$ of the source $E_1$ is too low, which is to say that $U_1<U_g$, thus the diode $D_4$ is blocked and the source $E_1$ does not give rise to any current flow; only the current supplied by the triggering generator $E_3$ circulates in the branch where the electrode and the piece are located, which current is greatly less than the necessary value for which the regulated mode engages or remains engaged.

If $U_1$ is caused to vary slowly from a low value, the phenomena described above can be observed which are the basis of the invention.

By observing with the help of an analog oscilloscope the transitory phase of the current, it is possible to see the signal spectrum whose width can be determined.

The values of $U_1$ less than a predetermined value, for example 18 volts, the current does not rise above the current supplied by the triggering generator, and thus the transitory phase of the current is not observed.

Above this predetermined value there begins to appear a narrow spectrum of discharges which increase and permit the regulated mode to be triggered.

Figure 2:
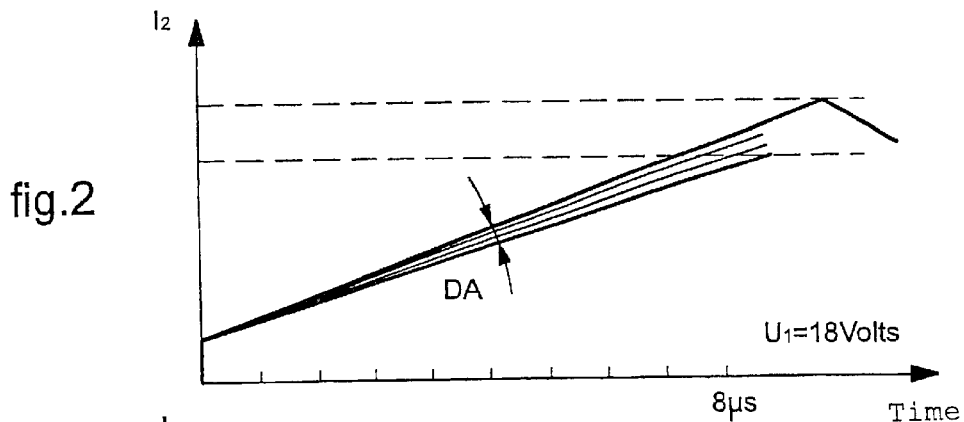
FIGS. 2 to 4 are views showing the angle of the slope of the increase of machining current for three values of voltage from the voltage source $E_1$.

The diagram of FIG. 2 showing the current $I_2$ as a function of time illustrates this narrow spectrum with a small angular distance DA between the maximum value of the angle of the slope AP max and the minimum value of the angle of the slope AP min.

$$DA=AP\ max-AP\ min$$

Figure 3:
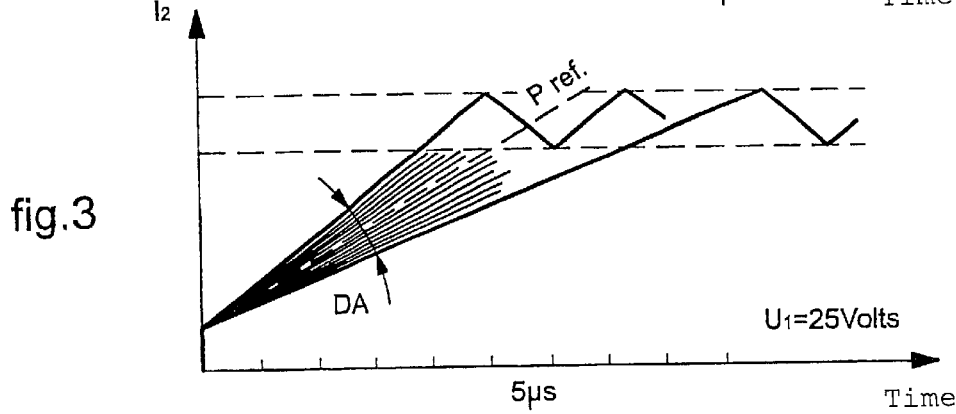

Adjacent a second value of $U_1$ (FIG. 3) of about for example 25 volts, the mean slope of the current increase $dI_2/dt$ is accentuated and the spectrum clearly enlarges. Adjacent this second value of $U_1$, the dispersion of the slopes of increase of current of the discharges is significantly greater than the angular difference $DA=AP\ max-AP\ min$ is increased.

Figure 4:
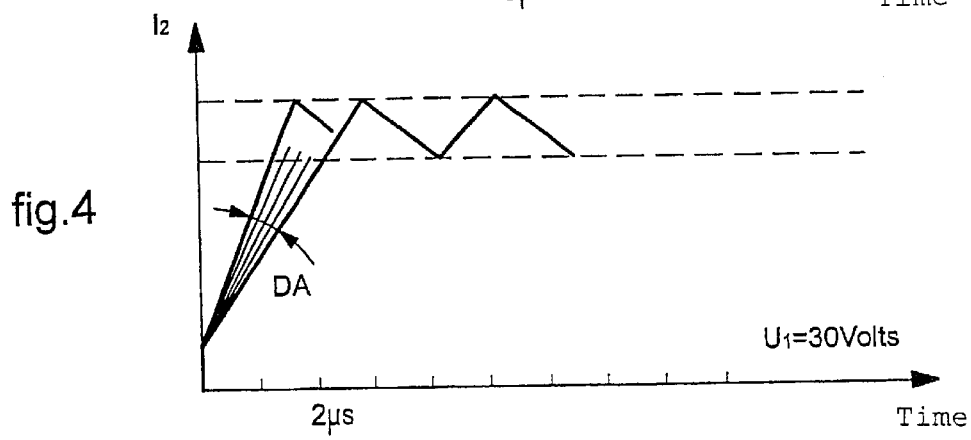

By progressively pursuing the increase of the voltage $U_{21}$ of the regulated source $E_1$, it will be seen (FIG. 4) that the spectrum of the slopes of increase of current $I_2/dt$, hence the dispersion given by the angular distance DA, decreases beyond a third value of voltage $U_1$, in the cited example of 30 volts, whilst the mean slope of increase of current $I_2/dt$ is further considerably accentuated.

Figure 5:
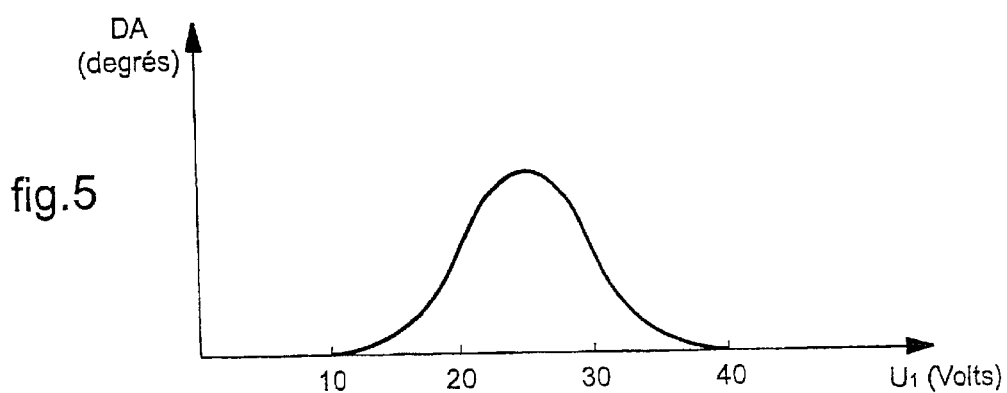
FIG. 5 shows the dispersion DA in degrees, of the slopes of current increase as a function of voltage $U_1$ from the voltage source $E_1$.

If said width of the spectrum is illustrated (FIG. 5) by the dispersion of the angle of the slope given by the value $DA=AP\ max-AP\ min$ as a function of the voltage $U_1$ of the adjusted source $E_1$, it will be noted that this dispersion exceeds a maximum value for a given value of $U_1$.

Technological tests carried out at various values of $U_1$ have permitted showing that the wear of the electrode is minimum when $U_1$ is adjusted to about the maximum of the value $DA=AP\ max-AP\ min$. The optimum value of $U_1=U_{ref}$ can be zeroed in on by means of preliminary technological tests, by measuring and comparing the respective wears of the electrode in each case. This optimum value of voltage $U_{ref}$ also corresponds to an optimum mean slope $P_{ref}$ of current increase $I_2/dt$. The same adjustment can be made by adjusting $U_2$ so as to obtain the optimum mean slope $P_{ref}$ of current corresponding to the optimum value of $U_{ref}$.

Figure 6:
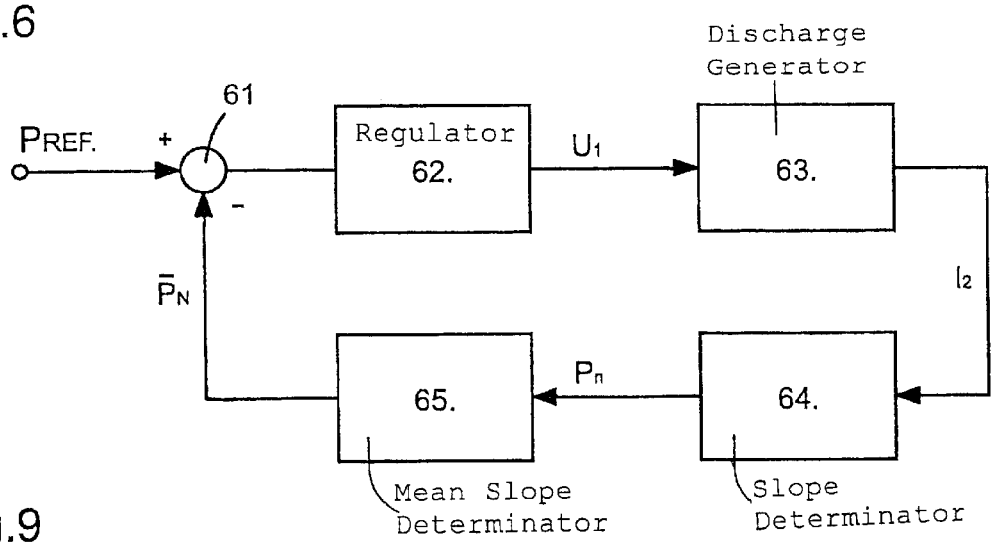
FIG. 6 is a diagram of the adjustment and servo control of the mean slope $\overline{P_N}$ of the current increases to a reference $P_{ref}$.

By measuring continuously the slope of increase $P_n$ of the current discharges during their transitory phase, there can be established a mean slope $\bar{P}_N$ that will be compared to an optimum mean reference slope $P_{ref}$ corresponding to the optimum adjustment of $U_1$ according to the diagram shown in FIG. 6.

This maximum value of angular dispersion DA is established experimentally for a given type of equipment and material and corresponds to an optimum means reference slope $P_{ref}$ which is used in the adjustment diagram for control of the slope of current increase (FIG. 6).

This adjustment diagram corresponds to a calculating member 61 adapted to calculate the arithmetic difference between the pre-established reference slope $P_{ref}$ and the mean slope $\bar{P}_N$ over sustained discharges. It comprises moreover a regulator 62 of the proportional or proportional-integral type for the internal voltage $U_1$ of the low impedance voltage source $E_1$, a device 63 for generating discharges, such as for example that described with reference to FIG. 1 comprises a low impedance current source $E_1$, the reading generating current impulses $I_2$, an element 64 arranged to determine the slope of increase of current $P_n$ of a discharge n, and a member 65 determining the mean slope $\overline{P}_N$ over the number N of discharges. The regulator 62 is arranged so as to modify the internal voltage $U_1$ as a function of the result of this arithmetic difference such that the mean slope $\overline{P}_N$ corresponds to the pre-established reference slope $P_{ref}$. Of course the elements 61, 62, 64 and 65 could be easily integrated into the control unit CP in the form of a programmable computer.

Figure 7:
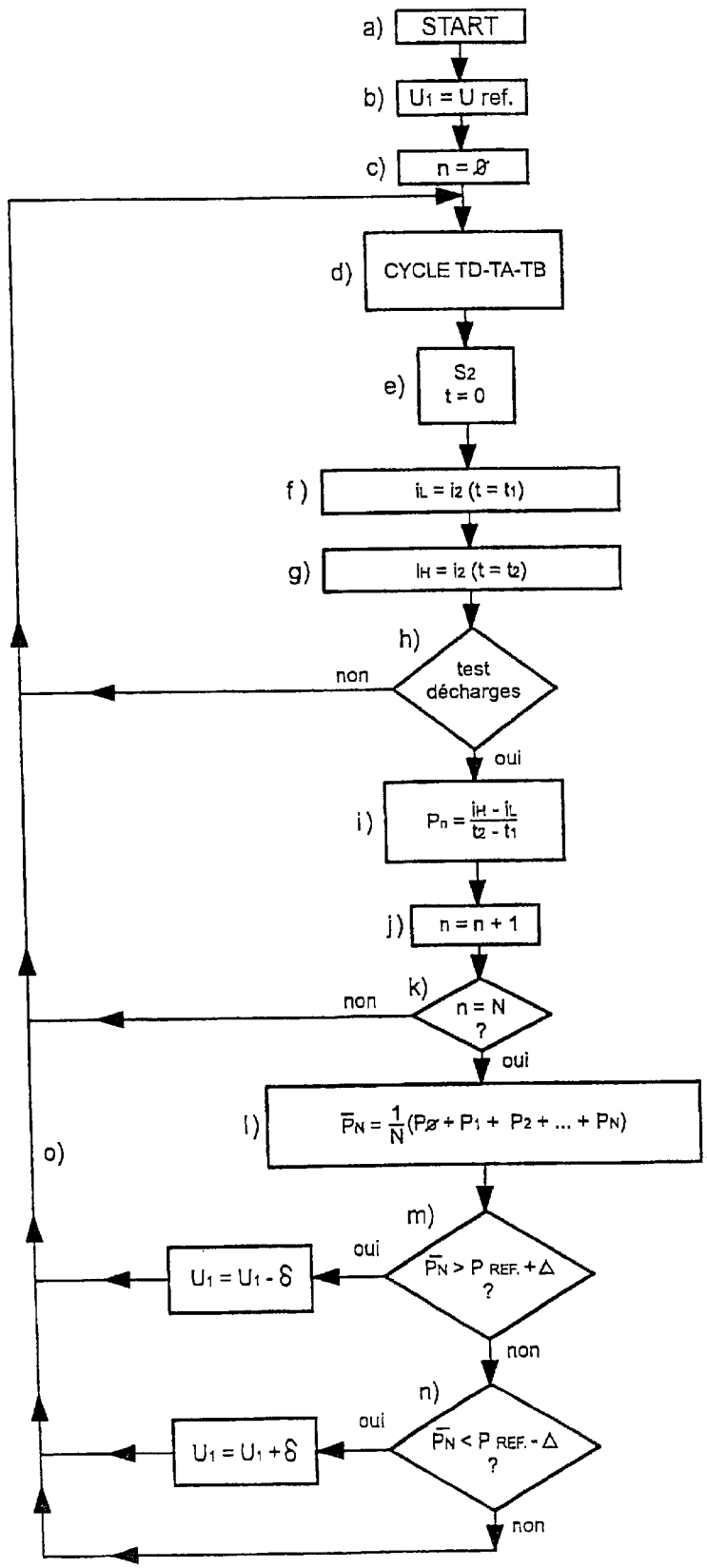
FIG. 7 is an organigram of the operation carried out during the servo control of the mean slope $\overline{P_N}$.

FIG. 7 shows an organigram for the control of the mean slope of increase of current $P_N$ of the erosive discharges. A control cycle comprises the following steps:

a) start, b) fixing the voltage $U_1$ of the source $E_2$ at an initial value equal to the pre-established reference value $U_{ref}$, c) setting a counter to 0, d) starting a discharge cycle with a triggering period TD, a sparking period TA and a pause period TB, e) starting at the beginning of the sparking period a counter of time t with an initial value t=φ at the instant at which the source $E_1$ is connected to the gap G, namely upon closing of the switch $S_2$, f) reading the current $I_2$ at $t_1$ to obtain a value IL g) reading the current $I_2$ at $t_2$ to obtain the value IH, h) evaluating the spark if it is seen to be a correct erosive discharge or not, according to the criteria explained hereafter, i) calculating the slope $P_n$ of the discharge according to the formula $P_n=(IH-IL)/(t_2-t_1)$, j) increasing the counter n by one unit, k) testing whether n=N, N being a predetermined number of discharges to calculate the mean slope $\overline{P}_N$ of current increase, l) calculating the mean slope $\overline{P}_N$, m) testing whether slope $\overline{P}_N$ is greater than the reference slope $P_{ref}$ added to an adjustment difference Δ and if yes, decreasing the voltage $U_1$ by a predetermined adjustment value δ, n) testing whether the slope $\overline{P}_N$ is less than the reference of $P_{ref}$ decreased by an adjustment difference δ and if yes, increasing the voltage $U_1$ of the adjustment value δ and o) recommencing a new control group with an adjusted $U_{ref}$.

By this arrangement, the mean slope of increase of current $\overline{P}_N$ of the erosive discharges can be controlled so as to coincide with the reference slope $P_{ref}$ corresponding to minimum wear of the electrode.

FIG. 8 shows a sequence as a function of time t of the signals obtained with the circuit of FIG. 1, namely the measured voltage $U_g$ across the gap, the open or closed condition of switches $S_1$, $S_2$ and $S_3$, the current $I_3$ flowing in the triggering branch $B_4$ measured by the measuring member $M_3$, the current $I_1$ measured by the measuring member $M_1$ and the current $I_2$ measured by the measuring member $M_2$. The current $I_g$ crossing the gap corresponding to the sum of the currents $I_2$ and $I_3$ is not shown. The first discharge figuring to the left of the diagram shows the case of a normal discharge carried out with a voltage $U_g$ across the gap whose drop is relatively slow and the slope of the current increase $I_2$ is relatively small.

Upon triggering the current $I_3$ through the branch $B_4$, the slope of increase of the current $I_2$ due to the source $E_1$ during the transitory phase is determined between the times $t_1$ and $t_2$. Then follows the regulated phase of discharge, during which the current $I_2$ is adjusted between the relatively narrow limits $I_p$ and $I_p-\Delta$ obtained by opening and closing the switch The discharge shown at the center of the figure corresponds to the discharge for which the voltage drop across the gap and the increase of current $I_2$ take place at intermediate values.

The third discharge corresponds to an unrestrained discharge because the fall of the voltage $U_g$ and increase in current $I_2$ are much too high. This discharge corresponds either to a short circuit, or to a discharge indicative of an arc. Such discharges are not taken into account for computing the slope in the organigram of FIG. 7 and spaced from the mean of the control unit CP.

This adjustment principle is directly based on the measurement of the mean slope of the increase of the current, but other variables are correlated with this means so it can be used to design a different adjustment device.

In this connection, it has been said that the source $E_1$ draws no current, in other words it remains blocked, when its voltage $U_1$ is less than $U_g$ and that only the current supplied by the triggering generator circulates in the machining gap. By causing $U_1$ to vary slowly from a low value, it can also be observed that the probability of blocking the source $E_1$ is correlated to the mean slope of the current rises. This permits designing another device for adjusting the voltage $U_1$, this time based on the counting of the discharges which do not permit the source $E_1$ to flow.

So as to detect discharge after discharge of this blocking phenomenon, it is possible very easily with the help of a detector or measuring member $M_2$ of the current $I_2$, to test and memorize whether the source $E_1$ has current flow or whether it remains blocked.

There will be retained as blocked discharges all discharges which have not permitted the regulated source $E_1$ to have current flow during the period in which the triggering generator has current flow, which is to say after the triggering moment.

Conversely, a discharge will be considered as unblocked if it causes current $I_2$ to flow at least once through the source $E_1$ during the period in which the triggering generator has current flow.

Counting the blocked discharges, there will be periodically established, for example every second, a quantity $TX_n$ of these so-called blocked discharges relative to all of the discharges. Knowing the number of unblocked discharges $D_n$ and the number of blocked discharges $D_b$ of the counting period, this quantity $TX_n$ will be computed in the control unit CP according to the formula: $TX_n=100\times Db/(Db+Dn)$.

The display of the blocked discharges therefore permits differently designing a device for carrying out the invention.

However, other types of well-known discharges can be produced when machining conditions deteriorate. There will be seen in more or less great number, for example short circuits, discharges announcing an arc or else so-called contaminated discharges.

These different categories of discharges can be referenced at the time which follows triggering and this by observing transitions of the voltage $U_g$ between electrode O and piece P, or by observing the behavior of the current $I_2$ with the help of the detector $M_2$, which permits discriminating them and excluding them during the formation $TX_n$.

Figure 9:
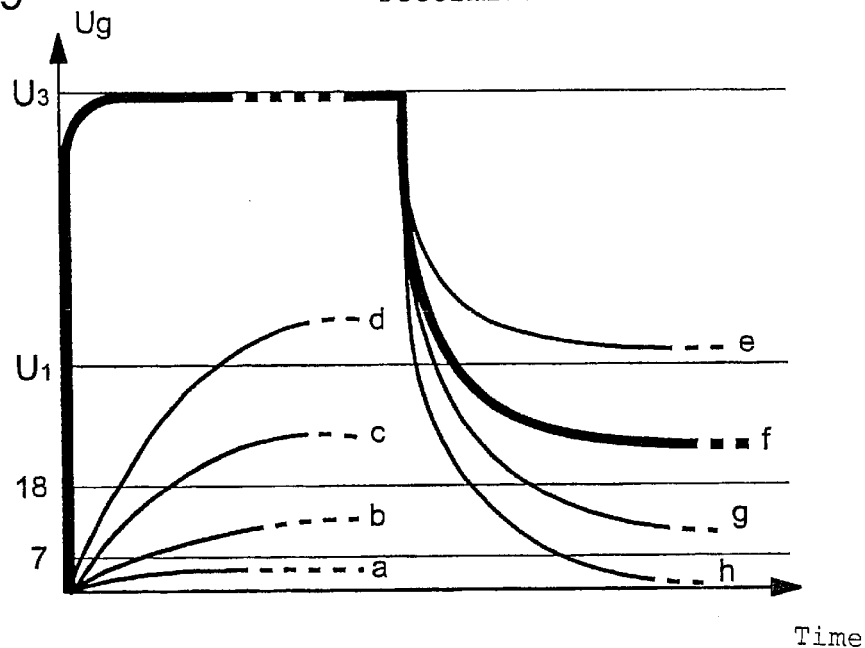
FIG. 9 shows the development of the voltage $U_g$ through the gap for different types of discharges.

FIG. 9 shows by way of example four voltage regions $U_g$ measured across the gap:

1) from 0 to about 7 V: short circuits 2) from 7 V to about 18 V: discharges characteristic of an arc 3) from 18 V to about $U_1$, namely the voltage of the low impedance source $E_1$: effective sparks or discharges retained in the statistics 4) from $U_g$ to $U_3$, namely the voltage delivered by triggering generator GA: blocked discharges.

When the triggering voltage $U_3$ delivered by the generator $E_3$ is applied at the end of the pause time, triggering can take place immediately. This is to say that the generator $E_3$ is caused to flow immediately with current as shown by the transitions a, b, c or d of FIG. 9 according to the machining conditions. To carry out the principle of the invention, it will be preferable to exclude these types a, b, c, d from the statistics.

Triggering is nevertheless generally retarded. The voltage $U_g$ rises thus to the value of the voltage $U_3$. A waiting time takes place before the triggering shown by the transitions e, f, g or h of FIG. 9 also become possible.

Only the transitions of the type f signal effective sparks adapted to be observed and retained in the statistics so as to form the mean slope $\overline{P}_N$.

All the other transitional cases, namely transitions of the type a) to e), g) and h), are not used to calculate the mean slope $\overline{P}_N$. Of course other means for discriminating undesirable discharges, and particularly contaminated discharges, can be envisaged. To give another example, discrimination can be carried out by observing the slope of current increase. Excessive slopes, beyond a certain limit, signal that the passage of the current takes place in the absence of counterelectromotive force in the gap, which is to say in the presence of a dielectric which has become resistive or contaminated or else in the presence of a short circuit.

Figure 10:
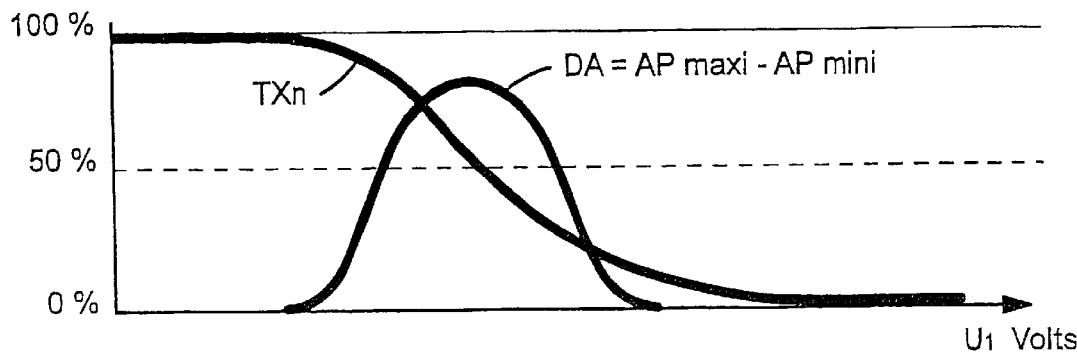
FIG. 10 shows a correlation between the size TXn of blocked discharges and the dispersion DA of the slopes of machining current increase as a function of the voltage $U_1$ of the voltage source $E_1$.

By causing the voltage $U_1$ of the source $E_1$ to vary, it will be seen that one can block a more or less large part of the population of the effective sparks as is shown in FIG. 10. This figure shows a correlation between the amount of retained discharges, but blocked ones $TX_n$, and the value DA corresponding to the angular difference of the dispersion of the spectrum of the slopes of increase of current of the retained discharges.

Figure 11:
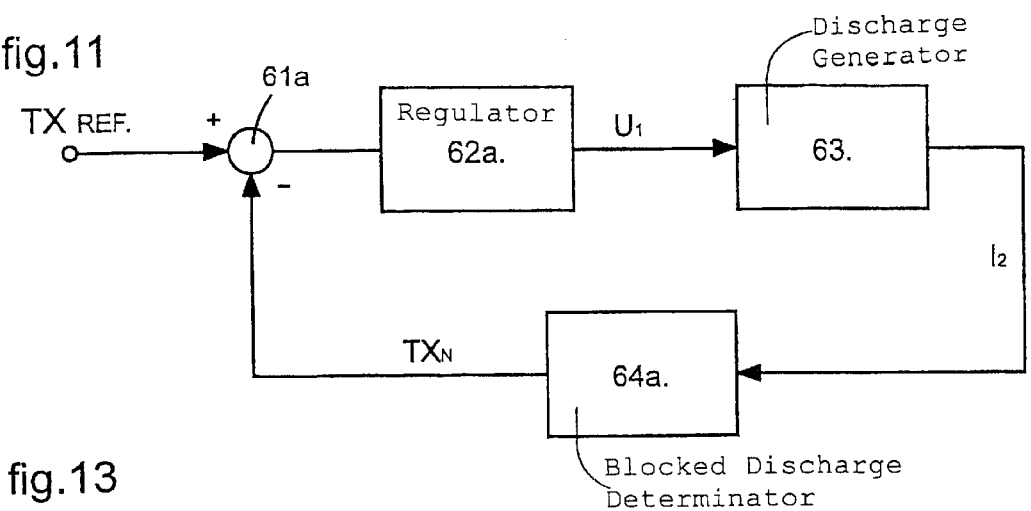
FIG. 11 shows a diagram of the adjustment of the servo control based on the size TXn of the blocked discharges.

As a result, when periodically calculating the amount $TX_n$ and comparing it to an optimum quantity $TX_{ref}$ of blocked discharges, there can be designed a regulator for the voltage $U_1$ from the source $E_1$ as is symbolized on the organigram of FIG. 11.

Then, by periodically calculating the quantity $TX_n$, and comparing it to an optimum quantity $TX_{ref}$ of blocked discharges, there can be designed a regulator of the voltage $U_1$ from the source $E_1$ as shown in the organigram of FIG. 11.

This adjustment scheme comprises a computer member 61*a* adapted to calculate the arithmetic difference between a quantity of pre-established references $TX_{ref}$ of blocked discharges and the quantity of blocked discharges obtained after N retained discharges, a regulator 62*a* permitting increasing or decreasing the voltage $U_1$ from the voltage source $E_1$, of low impedance, of a given adjustment value δ, a discharge generating device 63 permitting generating current impulses $I_2$ and a device 64*a* arranged so as to determine and to calculate the quantity of the blocked discharges $TX_n$ for a number N of retained discharges. The elements 61*a*, 62*a* and 64*a* could at least partially be integrated into the control unit CP. The regulator 62*a* is of course arranged so as to modify the internal voltage $U_1$ as a function of the arithmetic difference such that the quantity of blocked discharges $TX_n$ corresponds to the reference quantity $TX_{ref}$.

This adjustment arrangement permits carrying out servo control of the current increase of the erosive discharges by means of successive loops by starting a machining cycle TD, TA, TB with internal voltage $U_1$ fixed at an initial value corresponding to a pre-established reference voltage $U_{ref}$. The undesired discharges, namely, the contaminated ones, from short circuits and arcs, are thus separated out by a discrimination test. Then the blocked discharges are detected. This cycle is pursued n=N times and there is thus calculated the number $TX_n$ of blocked discharges which is compared to a pre-established reference number $TX_{ref}$ corresponding to minimum wear. According to the results, the internal voltage $U_1$ is respectively decreased or increased by an adjustment value δ if the calculated number is less than the reference number decreased by an adjustment subtraction Δ, respectively greater than the reference number increased by the adjustment difference Δ to obtain a new initial value of the internal voltage $U_1$ with which a new servo loop is recommenced.

Figure 12:
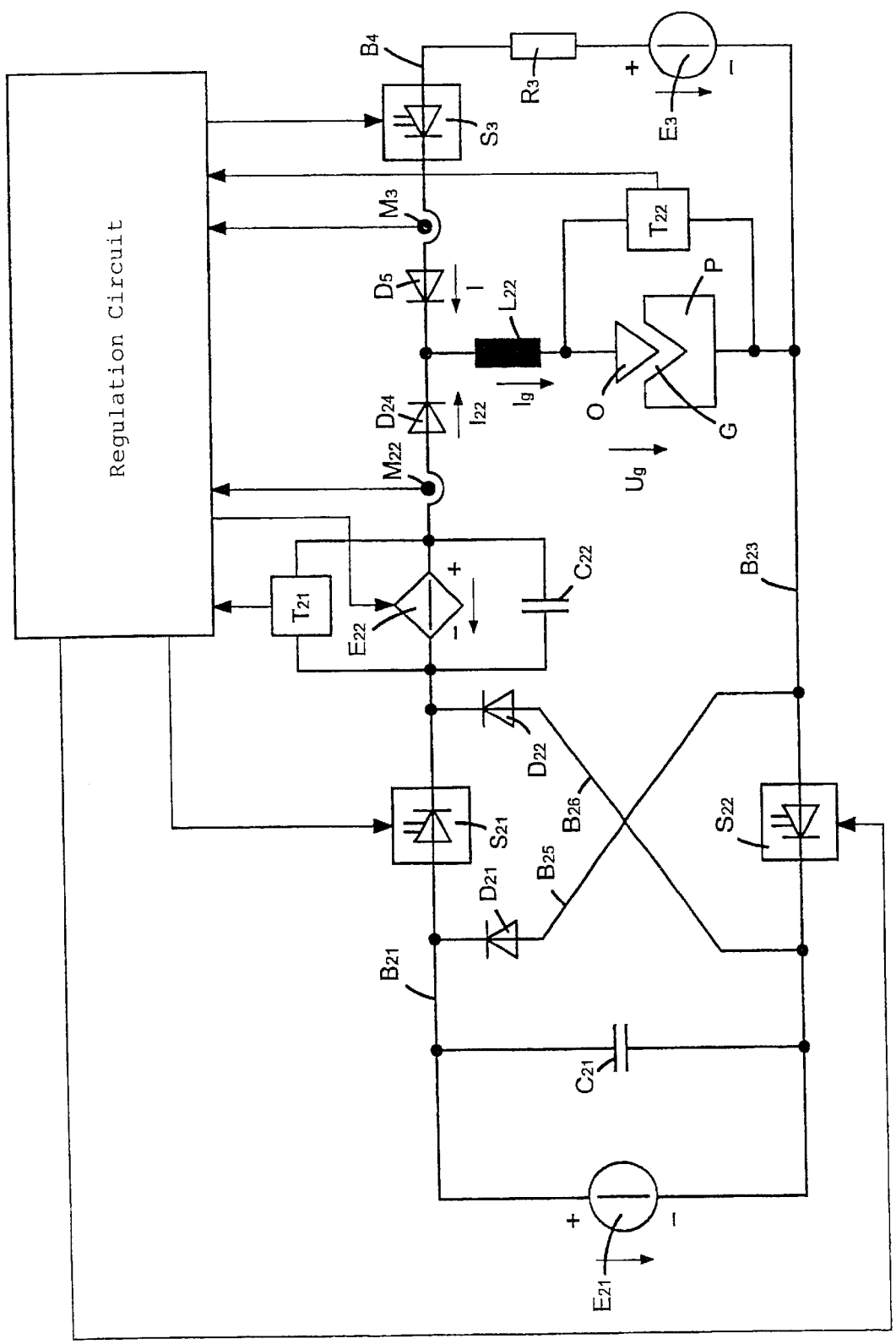
FIG. 12 is a schematic representation of a second embodiment of the device for machining by electroerosion.

The embodiment of circuit shown in FIG. 12 also comprises a voltage source $E_{21}$ of low impedance, adapted to supply in part the machining current necessary to cause the erosive discharges. This source $E_{21}$ has a continuous voltage stabilized at a voltage $U_1$ and is capable of supplying high intensity current, without important voltage drop. The positive terminal of this source $E_{21}$ is connected to the electrode O by a branch $B_{21}$ comprising in series a switch $S_{21}$, a further voltage source $E_{22}$ of low impedance whose voltage $U_{22}$ can be adjusted and controlled with high resolution, a measuring member $M_{22}$ for the current $I_{22}$ passing through this branch, a diode $D_{24}$, $L_{22}$ representing the parasitic line inductance.

The negative terminal of the voltage source $E_{21}$ is connected by a branch $B_{23}$ to the piece P separated by the gap G of the electrode O. This branch $B_{23}$ comprises a switch $S_{22}$. The branches $B_{21}$ and $B_{23}$ are moreover connected by a branch $B_{25}$ comprising a diode $D_{21}$ and a branch $B_{26}$ comprising a diode $D_{22}$, the branch $B_{25}$ being connected to the inputs of the two switches $S_{21}$ and $S_{22}$, whilst the branch $B_{26}$ is connected to the outputs of the two switches $S_{21}$ and $S_{22}$. The two branches $B_{25}$ and $B_{26}$ are thus arranged in a crossing fashion between the two branches $B_{21}$ and $B_{23}$ which contain the switches $S_{21}$ and $S_{22}$.

As in the embodiment of FIG. 1, a triggering circuit $B_4$ is branched in parallel between the electrode and the piece and comprises a triggering generator $E_3$, a resistance $R_3$, a switch $S_3$, a diode $D_5$ and a measuring number $M_3$ for the current $I_3$.

The circuit moreover comprises a capacitance $C_{21}$ connected in parallel to the source $E_{21}$ and a capacitance $C_{22}$ connecting the terminals of the additional source $E_{22}$. A potentiometer $T_{21}$ is moreover connected to the terminals of the additional source $E_{22}$ and another potentiometer $T_{22}$ to the electrode O and the piece P to measure the voltage $U_g$ across the gap G.

The assembly of this circuit is controlled by an electronic control unit CP receiving measuring signals from the elements $M_{22}$, $M_{31}$, $T_{21}$ and $T_{22}$ and addressing these control signals to the elements $E_{22}$, $S_{21}$, $S_{22}$ and $S_3$.

The values of the different components could typically be as follows:

The source $E_{21}$ of the order of 15 V for a power of 1 kW, the additional source $E_{22}$ adjustable between 10 and 40 V for a power of 1 kW, the source $E_3$ of the order of 100 V for a power of 300 W, the inductance $L_{22}$ about 2 μH, the resistance $R_3$ about 50 ohms and the capacitors $C_{21}$ and $C_{22}$ about 10 μF. Preferably, the impedance of the additional voltage source $E_{22}$ is zero.

The operation of the circuit according to FIG. 12 is as follows: in a pause period TB, the two switches $S_{21}$ and $S_{22}$ are open and the energy accumulated in the inductance $L_{22}$ dissipates in the form of a current which unblocks the two diodes $D_{21}$ and $D_{22}$. There is obtained the relaxation circuit $L_{22}$, gap, $D_{21}$, source 21 toward $D_{22}$, $E_{22}$, $M_{22}$, $D_{24}$. of course the source $E_{21}$ could carry without damage a current which passes through it from the positive terminal to the negative terminal whilst restoring to this source a portion of the energy accumulated in the inductance. Under these circumstances, the source $E_{21}$ breaks the current with the slope:

$$dI_2/dt=(-U_{21}+U_{22}-U_g)/L_{22}$$

wherein $U_{21}$ and $U_{22}$ are voltages of the sources $E_{21}$ and $E_{22}$ $U_g$ is the voltage across the tap The triggering period is obtained by closing the switch $S_3$. The high impedance source $E_3$ creates a high voltage across the gap G measured by the potentiometer $T_{22}$. When triggering takes place, the circuit permits selecting between two modes of machining that differ from each other in the transitory phase of current rise $I_2$, namely with a low slope of current rise $I_2$ to be moderated or a steep slope of current increase $I_2$.

The first embodiment, with a transitory phase of low slope $dI_2/dt$ is obtained by closing one of the switches $S_{21}$ or $S_{22}$, the other switch remaining open. The current rise takes place then under the influence of the additional source $E_{22}$ whose voltage $U_{22}$ is adjusted by the control unit CP. The charge circuits are either $E_{22}$, $M_{22}$, $L_{22}$, gap, $D_{21}$ and $S_{21}$ closed, or $E_{22}$, $M_{22}$, $L_{22}$, gap, $S_{22}$, closed and $D_{22}$.

The current $I_2$ is established with a slope $P_{n=dI2}/dt=(U_{22}-U_g)/L_{22}$.

If the empty voltage $U_{22}$ of the additional source $E_{22}$ is slightly greater than the discharge voltage $U_g$ and only a single transistor conducts, there is thus obtained a small positive slope in a transitory phase of slow rise. It is also possible to obtain a slow descending phase with $U_{22}$ slightly greater than $U_g$. When $U_{22}$ is equal to O, which is to say without the additional source $E_{22}$ which is the object of the invention, this descent phase will become a rapid descent.

Other slopes could be commutated in a very short time, of the order of a microsecond, thanks to the signals sent by the control unit CP to the switches $S_{21}$, $S_{22}$. In a rapid increase phase, the two transistors $S_{21}$ and $S_{22}$ are in the conductive state, the diodes $D_{21}$ and $D_{22}$ are blocked and if a discharge has previously taken place between the electrode O and the piece P, the circuit closes across the electrode-piece assembly. Under these circumstances, the current intensity rapidly increases with a slope:

$$P_n=dI_2/dt=(U_{21}+U_{22}-U_g)/L_{22}$$

The control unit CP is constructed according to known digital techniques, preferably with a microprocessor system. This assumes a phase of logical tasks, of which the first is to control the current by sending signals of the "all or nothing" type to the switches so as to generate approximately a current impulse of the desired shape.

It also ensures the adjustment and control of the voltage $U_{22}$ of the additional generator $E_{22}$, for example according to the adjustment scheme shown in FIG. 6, and operating according to the organigram of FIG. 7. The circuit shown in FIG. 12 therefore permits generating erosive discharges similar to those shown in FIG. 8, with a transitory phase during which the slope P of increase in current of the discharges is servo controlled to correspond to a pre-established reference slope $P_{ref}$ and then with a regulated mode phase during which the discharge current $I_2$ is adjusted to a reference value $I_p$.

The embodiment of FIG. 12 therefore permits obtaining different types of increases and decreases of current. Concretely, several numerical examples are shown hereafter: for the values $U_{21}=15$ V, $U_g=20$ V, $L_{22}=2$ $\mu$H.

| Phase | $S_{21}$ | $S_{22}$ | $L_{22} \times dI_2/dt$ | $U_{22}$ | $L_{22} \times dI_2/dt$ | $dI_2/dt$ |
|---|---|---|---|---|---|---|
| Slow increase | 1 | 0 | $U_{22} - U_g$ | 25 | 5 | 2.5 A/$\mu$s |
| Rapid increase | 1 | 1 | $U_{21} + U_{22} - U_g$ | 25 | 20 | 10 A/$\mu$s |
| Descent | 0 | 0 | $-U_{21} + U_{22} - U_g$ | 25 | −10 | −5 A/$\mu$s |
| Slow descent | 1 | 0 | $U_{22} - U_g$ | 15 | −5 | −2.5/$\mu$s |
| Rapid descent | 0 | 0 | $-U_{21} + U_{22} - U_g$ | 0 | −35 | −17.5/$\mu$s |

In a regime of very low wear, there is established the slow current increase by closing only one of the switches $S_{21}$ or $S_{22}$ and by adjusting $U_{22}$ such that the mean slope $\overline{P}_N$ therefore corresponds to $P_{ref}$ during the transitory phase by beginning with a pre-established voltage $U_{ref}$ for the additional generator $E_{22}$. Once the reference value $I_p$ of the current $I_2$ is reached, we enter the regulated mode phase in which the current $I_2$ is maintained between its limits $I_p$ and $I_p-\Delta$ by opening and closing one or the other or both switches $S_{21}$, $S_{22}$.

This circuit therefore permits a large flexibility of application to various adjustments of rising and descending slopes of the machining current. Of course the adjustment and control means explained with reference to FIGS. 2 to 7, 10 and 11 are applicable directly by acting on the voltage $U_{22}$ of the additional voltage source $E_{22}$.

Figure 13:
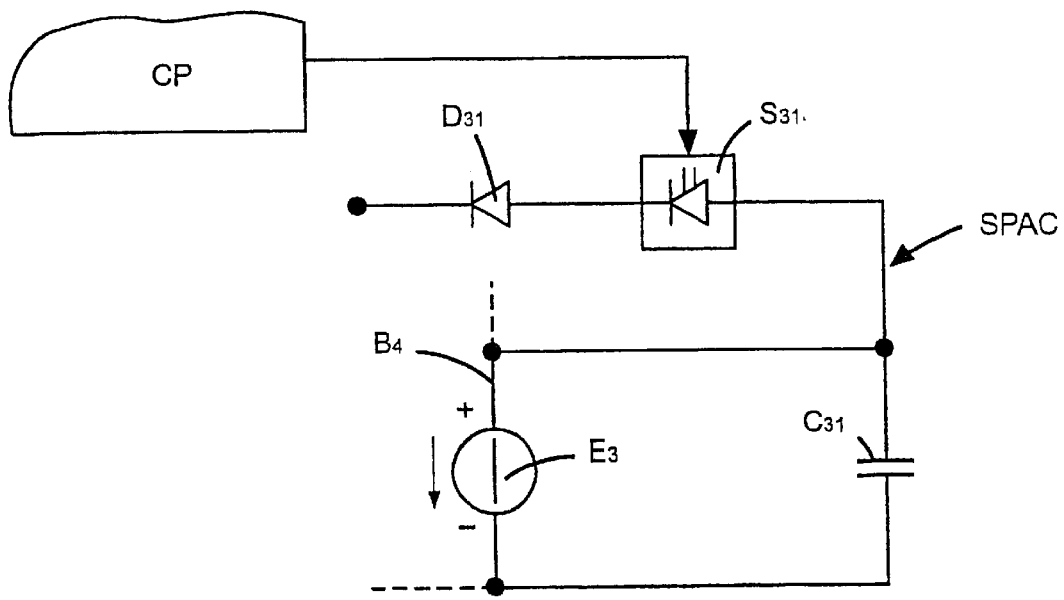
FIG. 13 shows a device for anti-short-circuit protection adapted to be integrated into the two described embodiments.
Figure 14:
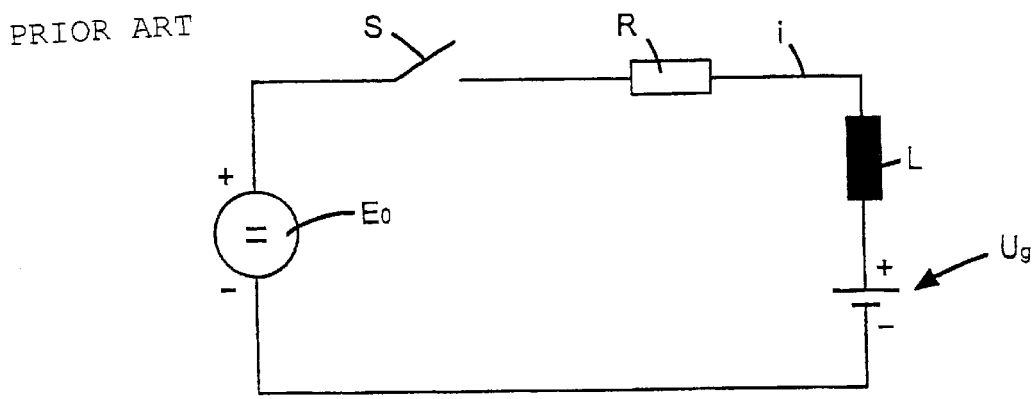
FIG. 14 is a simplified diagram of a generator according to the prior art.

The embodiments described above are preferably accompanied, in modification, by an anti-short-circuit protective device SPAC, as shown in FIG. 13.

It has been noted that a large number of the metallic bridges which form in the sparking space during finishing machining, are sufficiently fragile that they are destroyed by melting by the passage of a particular current pulse which is added to the normal machining current and which permits retriggering the erosive effect. There is thus obtained a substantial increase of the machining output relative to that obtained by conventional methods, which consists in stopping the impulse current and achieving rupture of the metallic bridge by tearing under the effect of with-drawing the electrode.

The current pulse adapted to break the metallic bridge is not applied immediately after a short circuit is detected, but a delay of the order of 1 microsecond is necessary before injecting with minimum impedance a current several times greater than the nominal machining current. The duration of application is of several microseconds before retriggering takes place in the majority of cases. If this is not the case, it is useless to maintain a strong current for a long time because that signifies that the short circuit is due to direct contact between the two electrodes.

This is why it is possible to produce such a device with the help of a simple capacitance $C_{31}$ of high value, for example 10 $\mu$F, connected to the terminals of the triggering generator $E_3$. Charging has the time to take place during the interval between two successive triggerings. Said capacitance $C_{31}$ will discharge through the machining cable by means of a switch $S_{31}$ and a supplementary diode $D_{31}$ as shown in the schematic drawing of FIG. 13. The switch $S_{31}$, for example in the form of a transistor, is controlled by the control unit CP when the latter detects a short circuit, as described above in connection with FIG. 9.

Such an anti-short-circuit protection device SPAC can be installed in parallel on any type of electroerosion circuit. It becomes particularly important to use it in devices which permit carrying out the present invention because a slow increase of machining current is unfavorable the melting effect on the metallic bridges.

Of course other types of machining devices by electroerosion could be adapted for the practice of the present invention and it will be understood to this effect that adjustment means permitting influencing the increase of the machining current at least during the transitory phase or initial discharge phase are included. There could for example be used a generator with resistive current limitation, but improved by the addition of an auxiliary low impedance voltage source acting at the beginning of discharge, so as to be able to produce impulses as shown in FIG. 8. A known circuit could also be adapted, known as a DC-DC converter, but controlled such that at the beginning of discharge it will be equivalent to an auxiliary voltage source of low impedance.

The process used in all these devices is however similar and is characterized by the fact that an adjustment of the current increase of the electrical impulses or charges is carried out after the triggering of a discharge between the electrode and the piece. This adjustment is carried out such that a parameter connected to this current increase, such as the slope of the rise P or the number of blocked discharges $TX_n$ or the adjustable voltage $U_1$, $U_{22}$, are substantially equal to a reference size corresponding to a minimum value of electrode-tool wear. This reference size could be a reference slope, a reference quantity of the blocked discharges, an internal reference voltage, etc., first determined in a laboratory or on the production site. The surprising result of the wear measurements in the experiment, which consists in causing the internal voltage $U_1$, $U_{22}$ to vary gradually from the adjustable voltage source, is that there is a minimum of wear in a narrow range of voltages, during which very high dispersion in the slopes of machine current increase are noted during the transitory phase.

There can therefore be made a series of technological tests to produce a table which gives an optimum or reference value of this internal voltage of the slope or else the number of blocked discharges for each machining regime of very low wear, in question, a machining regime being defined for example by the machining current Ip, the trigger time TD, machining time TA and pause time TB, the material couple used, etc. An adjustment of the machining device with its pre-established parameters can give good results as to wear. However, the point of adjustment is of such criticality that good results in the laboratory are not necessarily reached on the job site. Various factors could play a role, such as the temperature and the more or less strict tolerance of the elements during a mass production. But the greatest dispersion comes from parasitic line inductance, which can vary over wide ranges, for example from simple tripling according to the internal wiring of the device and the length of the line. Servo control permits freedom from these dispersions and permits obtaining an industrial device capable of reproducing at the job site the best results as to wear.

This control can be carried out by means of a control loop such that a greater statistic representative of said parameter, such as the slope of increase of the current or the number of block discharges, coincides with the predetermined reference size.

It is thus possible to memorize tables of technology which contain for each regime not only a value $U_{ref}$ which fixes first of all the value of the voltage $U_1$, $U_{22}$ of the adjustable voltage source, but also a value $P_{ref}$ which serves as a reference for the mean slope $P_N$ of the current increases, which slope is the result of measurements in real time. The optimum value of $P_{ref}$ which gives very low wear is the result of technological tests carried out at the outset to load the memory of the control unit CP. The control serves to cause the voltage $U_1$, $U_{22}$ to vary so as to correct any distance between $P_N$ and $P_{ref}$; for example, if the mean slope $P_N$ is smaller than the reference slope $P_{ref}$, then the voltage $U_1$, $U_{22}$ is increased incrementally, which has for the effect giving rise to more abrupt current increases, and the process takes place until one practically has $P_N = P_{ref}$ (see FIGS. 6 and 7).

The control unit CP has capabilities of rapid data processing, carried out in known manner with digital electronics, for example a microprocessor. To start an impulse of the "very low wear" type, there is sent to the control unit a series of directives, particularly as to the values of $I_p$, TD, TA, TB, $U_{ref}$ and $P_{ref}$.

A control is thus applied during all the machining or during an initial phase. If desired, one can settle preforming the representative size of the mean slope, which will be simpler and more rapid to calculate, for example by supposing that $t_1=0$, or in other words by calculating the mean of the currents measured in $t_2$. What is important is that the preliminary technological tests and the controls of the machines use the same technique to define the representative statistical size. Under these conditions, there can even be used the greatest current i observed over time $t_2$ over a series of discharges.

Of course the control can take place in a similar manner with other parameters, such as the weight of the block discharges. The sizes of references can also be predetermined experimentally, for example, by carrying out weight measurements or dimensional measurements of the electrode tool.

Of course the embodiments described above are in no way limiting and may be the subject of any desirable modification within the scope defined by the independent claims.

What is claimed is:

1. Process for machining by electroerosion, according to which an electrode piece (P) is machined by an electrode-tool (O) separated from each other by a working space (G) by applying electrical impulses between the electrode-tool and the electrode-piece by an electrical circuit comprising at least one low impedance voltage source ($E_1$, $E_{22}$) and a regulation circuit (CP), characterized by the fact that an adjustment of the increase of current of the electrical impulses is controlled as a function of the time after triggering a discharge between the electrode-tool and electrode-piece such that a parameter ($P_N$, $TX_n$) connected to this current increase will be substantially equal to a reference amount ($P_{ref}$, $TX_{ref}$) corresponding to a minimum wear value of the electrode tool and the adjustment of the current increase is carried out by loop such that a statistical size ($P_N$, $TX_n$) representative of said parameter coincides with said predetermined reference size ($P_{ref}$, $TX_{ref}$).

2. Process according to claim 1, characterized by the fact that there is carried out the adjustment of the current increase of the electrical impulses during a first transitory phase and that there is maintained in a second phase the machining current with at least one reference value as soon as the increase in current has reached this reference value ($I_p$).

3. Process according to claim 1, characterized by the fact that the size of the reference ($P_{ref}$, $TX_{ref}$, $U_{ref}$) is experimentally predetermined by carrying out measurements of weight or dimensions of the electrode-tool.

4. Process according to claim 1, characterized by the fact that said adjustment is carried out by acting on the adjustable internal voltage ($U_1$, $U_{22}$) of at least one low impedance adjustable voltage source ($E_1$, $E_{22}$).

5. Process according to claim 4, characterized by the fact that the reference size ($P_{ref}$) corresponding to a minimum wear value is determined by causing the internal voltage ($U_1$, $U_{22}$) of the adjustable voltage source ($E_1$, $E_{22}$) to vary and by observing the dispersion of the spectrum of the slope angles (DA) of increase of current of a given number of discharges.

6. Process according to claim 5, characterized by the fact that the reference size ($P_{ref}$) is obtained when the dispersion, of the spectrum of the slope angles (DA) is substantially a maximum.

7. Process according to claim 4, characterized by the fact that said parameter is the mean slope ($\overline{P}_N$) of increase of the machining current, adjusted so as to coincide with a pre-established reference slope ($P_{ref}$) for minimum wear of the electrode tool.

8. Process according to claim 7, characterized by the fact that there is carried out a control of a mean slope of current increase ($P_N$) of the erosive discharges by successive servo control loops, by launching a machining cycle (TD, TA, TB) with said internal voltage ($U_1$, $U_{22}$) fixed at an initial value corresponding to a pre-established reference voltage ($U_{ref}$), by discarding by a discrimination test the contaminated discharges, by short-circuits and arcs, by determining the slope of current increase ($P_n$) of the retained discharges, by carrying out n=N machining cycles, by calculating the mean slope of current increase ($P_N$) for the N retained discharges, by comparing the mean slope of current increase ($P_N$) obtained for said reference slope ($P_{ref}$), by decreasing or increasing the internal voltage ($U_2$, $U_{22}$) from a predetermined adjusted value, if the mean slope ($P_N$) calculated is greater than the reference slope ($P_{ref}$) plus an adjustment spacing ($\Delta$), or lower than the reference slope ($P_{ref}$) diminished by said adjustment spacing ($\Delta$), so as to obtain a new initial value of said internal voltage ($U_1$, $U_{22}$), and by carrying out successive servo control loops with the new initial values of the internal voltage ($U_1$, $U_{22}$).

9. Process according to claim 4, characterized by the fact that said parameter is the number of blocked discharges ($TX_n$) during which the low impedance voltage source does not flow with current, the increase in current of the electrical impulses being adjusted such that the number of the blocked discharges ($TX_n$) coincides with a reference number ($TX_{ref}$) corresponding to minimum wear.

10. Process according to claim 9, characterized by the fact that a servo loop is carried out for the current increase of the erosive discharges by successive servo loops, by starting a machining cycle (TD, TA, TB) with said internal voltage ($U_1$, $U_{22}$) fixed to an initial value corresponding to a pre-established reference voltage ($U_{ref}$), by getting rid of by a discrimination test the contaminated discharges by short-circuits and arcs, by detecting the blocked discharges, by carrying out n=N machining cycles, by computing the number of blocked discharges ($TX_n$), by comparing the number of blocked discharges to a pre-established reference number ($TX_{ref}$) corresponding to minimum wear of the electrode-tool, by decreasing respectively increasing, the internal voltage ($U_1$, $U_{22}$) by an adjustment value ($\delta$), if the calculated number ($TX_n$) is lower than the reference number decreased by an adjustment spacing, respectively greater than the reference number with the adjustment spacing added, so as to obtain a new initial value of the internal voltage ($U_1$, $U_{22}$) and by carrying out successive servo loops with the new initial values of the internal voltage ($U_1$, $U_{22}$) obtained.

11. Device for practicing a machining process by electroerosion, comprising an electrode-tool (O) separated by a working slot (G), of an electrode-piece (P), an electrical circuit with at least one low impedance voltage source ($E_1$, $E_{22}$) and an adjustment circuit (CP) arranged so as to apply electrical impulses between the electrode-tool and the electrode-piece, characterized by the fact that it comprises adjustment means to adjust the rate of current increase ($dI_2/dt$) as a function of the time after triggering a discharge between the electrode-tool and the electrode-piece such that a parameter ($P_N$, $TX_n$) connected with this current increase will be substantially equal to a reference size ($P_{ref}$, $TX_{ref}$) corresponding to a minimum wear value of the electrode-tool, said parameter is the mean slope ($P_N$) of increase of machining current and it comprises means adapted to adjust this mean slope such that it coincides number of blocked discharges ($TX_n$) for a predetermined number (N) of discharges, and a computing number (61a) adapted to compute the arithmetic difference between the reference number ($TX_{ref}$) and the number of blocked discharges ($TX_n$), the regulator (62a) being arranged to as to modify said internal voltage ($U_1$) as a function of the result of this arithmetic difference, such that the number of blocked discharges ($TX_n$) corresponds to the reference number ($TX_{ref}$).

12. Device according to claim 11, characterized by the fact that it comprises servo control means (CP) for the slope of increase of the machining current, with a pre-established reference slope ($P_{ref}$), comprising a regulator (62) of said internal voltage ($U_1$, $U_{22}$) of the voltage source, a discharge generating device (63), a first element (64) arranged so as to calculate the slope of increase of the current ($P_n$) of a discharge, a second element (65) adapted to calculate the mean slope ($P_N$) of a predetermined number (N) of discharges and a third element (61) adapted to calculate the arithmetic difference between the reference slope ($P_{ref}$) and the mean slope ($P_N$), the regulator (62) being arranged so as to modify said internal voltage ($U_1$, $U_{22}$) as a function of the result of this arithmetic difference, such that the mean slope ($P_N$) corresponds to the reference slope ($P_{ref}$).

13. Device according to claim 11, characterized by the fact that the adjustment means are arranged so as to modify the internal voltage ($U_1$, $U_{22}$) adjustable from at least one low impedance voltage source ($E_1$, $E_{22}$).

14. Device for practicing a machining process by electroerosion, comprising an electrode-tool (O) separated by a working slot (G), of an electrode-piece (P), an electrical circuit with at least one low impedance voltage source ($E_1$, $E_{22}$) and an adjustment circuit (CP) arranged so as to apply electrical impulses between the electrode-tool and the electrode-piece, characterized by the fact that it comprises adjustment means to adjust the rate of current increase ($dI_2/dt$) as a function of the time after triggering a discharge between the electrode-tool and the electrode-piece such that a parameter ($P_N$, $TX_n$) connected with this current increase will be substantially equal to a reference size ($P_{ref}$, $TX_{ref}$) corresponding to a minimum wear value of the electrode-tool, said parameter is the mean slope ($P_N$) of increase of machining current and it comprises means adapted to adjust this mean slope such that it coincides with a pre-established reference slope ($P_{ref}$) at which minimum wear of the electrode tool is achieved, wherein said parameter is the number of blocked discharges ($TX_n$) during which the low impedance voltage source does not flow with current, by the fact that it comprises means adapted to regulate said current increase such that the number of blocked discharges ($TX_n$) corresponds with a pre-established reference number ($TX_{ref}$) corresponding to minimum wear of the electrode-tool.

15. Device according to claim 14, characterized by the fact that it comprises control means for the number of the blocked discharges ($TX_n$) with a pre-established reference number ($TX_{ref}$), comprising a regulator (62a) for the internal voltage ($U_1$), a discharge generating device (63), a device (64a) arranged so as to determine and to compute the ($E_1$, $E_{22}$) and an adjustment circuit (CP) arranged so as to apply electrical impulses between the electrode-tool and the electrode-piece, characterized by the fact that it comprises adjustment means to adjust the rate of current increase ($dI_2/dt$) as a function of the time after triggering a discharge between the electrode-tool and the electrode-piece such that a parameter ($P_N$, $TX_n$) connected with this current increase will be substantially equal to a reference size ($P_{ref}$, $TX_{ref}$) corresponding to a minimum wear value of the electrode-tool, further comprising a first low impedance voltage source ($E_{21}$) whose first terminal is connected to the electrode-tool (O) by a first branch ($B_{21}$) comprising, in series, a first switch ($S_{21}$), an additional low impedance voltage source ($E_{22}$) whose internal voltage ($U_{22}$) can be adjusted by a control unit (CP), a current measuring member ($M_{22}$) and a first diode ($D_{24}$), wherein the electrode-piece is connected by a second branch ($B_{23}$) with a second switch ($S_{22}$) to the second terminal of the first voltage source ($E_{21}$), and comprising a third branch ($B_{25}$) comprising a second diode ($D_{22}$) connecting the inputs of the two switches ($S_{21}$, $S_{22}$) and a fourth branch ($B_{26}$) comprising a third diode ($B_{22}$) connecting the outputs of the two switches ($S_{21}$, $S_{22}$), the control unit receiving signals from the measuring member ($M_{22}$) and addressing control signals to the additional voltage source ($E_{22}$) and to the switches ($S_{21}$, $S_{22}$).

16. Device for practicing a machining process by electroerosion, comprising an electrode-tool (O) separated by a working slot (G), of an electrode-piece (P), an electrical circuit with at least one low impedance voltage source ($E_1$, $E_{22}$) and an adjustment circuit (CP) arranged so as to apply electrical impulses between the electrode-tool and the electrode-piece, characterized by the fact that it comprises adjustment means to adjust the rate of current increase ($dI_2/dt$) as a function of the time after triggering a discharge between the electrode-tool and the electrode-piece such that a parameter ($P_N$, $TX_n$) connected with this current increase will be substantially equal to a reference size ($P_{ref}$, $TX_{ref}$) corresponding to a minimum wear value of the electrode-tool, said parameter is the mean slope ($P_N$) of increase of machining current and it comprises means adapted to adjust this mean slope such that it coincides with a pre-established reference slope ($P_{ref}$) at which minimum wear of the electrode tool is achieved, further comprising a first voltage source ($E_1$) with low impedance, whose internal voltage ($U_1$) can be adjusted by means of a control unit (CP), a first branch ($B_1$) connecting a first terminal of the first voltage source ($E_1$) to the electrode-tool (O) and comprising, in series, a second low impedance voltage source ($E_2$), a first switch ($S_1$), a first measuring member ($M_1$) a first current ($I_1$), a self-induction winding ($L_1$), a second switch ($S_2$), a second measuring member ($M_2$) of a second current ($I_2$) and a first diode ($D_4$), the input of the second switch ($S_2$) being connected by a second diode ($D_2$) to the first terminal of the first voltage source ($E_1$), wherein the electrode-piece (P) is connected to the second terminal of the first source ($E_1$) by a third branch ($B_3$), itself connected by a third diode ($D_1$) to the outlet of the first switch ($S_1$) and by a fourth diode ($D_3$) at the output of said second switch ($S_2$), the control unit receiving signals from the measuring members ($M_1$, $M_2$, $M_3$) and addressing control signals to the first voltage source ($E_1$) and to the switches ($S_1$, $S_2$).

17. Device according to claim 16, characterized by the fact that it comprises a triggering circuit for the erosive discharges ($B_4$) connected in parallel between the electrode-tool (O) and the electrode-piece (P), the circuit comprising a generator ($E_3$) and a switch ($S_3$) receiving control signals from the control unit (CP).

18. Device according to claim 17, characterized by the fact that it comprises an anti-short-circuit protection device (SPAC) comprising a capacitance connected to the terminals of the generator ($E_3$) of the triggering circuit and adapted to be connected to the electrode-tool (O) by a diode ($D_{31}$) and a switch ($S_{31}$) receiving control signals from the control unit (CP).

19. Device for practicing a machining process by electroerosion, comprising an electrode-tool (O) separated by a working slot (G), of an electrode-piece (P), an electrical circuit with at least one low impedance voltage source with a pre-established reference slope ($P_{ref}$) at which minimum wear of the electrode tool is achieved.

20. Device according to claim 19, characterized by the fact that it comprises a triggering circuit for the erosive discharges ($B_4$) connected in parallel between the electrode-tool (O) and the electrode-piece (P), the circuit comprising a generator ($E_3$) and a switch ($S_3$) receiving control signals from the control unit (CP).

21. Device according to claim 20, characterized by the fact that it comprises an anti-short-circuit protection device (SPAC) comprising a capacitance connected to the terminals of the generator ($E_3$) of the triggering circuit and adapted to be connected to the electrode-tool (O) by a diode ($D_{31}$) and a switch ($S_{31}$) receiving control signals from the control unit (CP).

22. Process for machining by electroerosion, according to which an electrode piece (P) is machined by an electrode-tool (O) separated from each other by a working space (G) by applying electrical impulses between the electrode-tool and the electrode-piece by an electrical circuit comprising at least one low impedance voltage source ($E_1$, $E_{22}$) and a regulation circuit (CP), characterized by the fact that an adjustment of the increase of current of the electrical impulses is controlled as a function of the time after triggering a discharge between the electrode-tool and electrode-piece such that a parameter ($P_N$, $TX_n$) connected to this current increase will be substantially equal to a reference amount ($P_{ref}$, $TX_{ref}$) corresponding to a minimum wear value of the electrode tool and wherein the adjustment of the current increase is carried out by loop such that a statistical size ($P_N$, $TX_n$) representative of said parameter coincides with said predetermined reference size ($P_{ref}$, $TX_{ref}$), wherein the size of the reference ($P_{ref}$, $TX_{ref}$, $U_{ref}$) is experimentally predetermined by carrying out measurements of weight or dimensions of the electrode-tool.

* * * * *